United States Patent
Eckel (10) Patent No.: US 9,774,187 B2
(45) Date of Patent: Sep. 26, 2017

(54) COUPLING-IN AND COUPLING-OUT OF POWER IN A BRANCH OF A DC VOLTAGE NETWORK NODE COMPRISING A LONGITUDINAL VOLTAGE SOURCE

(75) Inventor: Hans-Guenter Eckel, Rostock (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 361 days.

(21) Appl. No.: 14/409,221

(22) PCT Filed: Jun. 19, 2012

(86) PCT No.: PCT/EP2012/061737
§ 371 (c)(1),
(2), (4) Date: Dec. 18, 2014

(87) PCT Pub. No.: WO2013/189526
PCT Pub. Date: Dec. 27, 2013

(65) Prior Publication Data
US 2015/0145330 A1    May 28, 2015

(51) Int. Cl.
*H02J 1/00* (2006.01)
*H02J 1/14* (2006.01)
*H02J 3/36* (2006.01)

(52) U.S. Cl.
CPC ............... *H02J 1/14* (2013.01); *H02J 3/36* (2013.01); *Y02E 60/60* (2013.01); *Y10T 307/352* (2015.04)

(58) Field of Classification Search
USPC .............................................. 307/69, 77, 78
See application file for complete search history.

(56) References Cited

U.S. PATENT DOCUMENTS

| | | | |
|---|---|---|---|
| 5,414,612 | A | 5/1995 | Björklund et al. |
| 6,288,915 | B1 | 9/2001 | Stemmler |
| 7,218,014 | B2 | 5/2007 | Steinke |
| 8,144,488 | B2 | 3/2012 | Petersson et al. |
| 8,553,433 | B2 | 10/2013 | Juhlin |
| 8,847,430 | B2 | 9/2014 | Juhlin |
| 2013/0170255 | A1 | 7/2013 | Mukherjee et al. |

FOREIGN PATENT DOCUMENTS

| | | |
|---|---|---|
| CN | 1113095 A | 12/1995 |
| CN | 1283322 A | 2/2001 |
| CN | 1424797 A | 6/2003 |
| CN | 101517854 A | 8/2009 |
| CN | 102449870 A | 5/2012 |
| WO | 2010115452 A1 | 10/2010 |
| WO | 2010115453 A1 | 10/2010 |
| WO | 2012037966 A1 | 3/2012 |

*Primary Examiner* — Rexford Barnie
*Assistant Examiner* — Dru Parries
(74) *Attorney, Agent, or Firm* — Laurence Greenberg; Werner Stemer; Ralph Locher (57) ABSTRACT

A device for load flow control of a direct current in a branch of a direct current voltage network node having a longitudinal voltage source which has a coupling device for connection or disconnection of electrical power. The coupling device for connection and disconnection of electrical power are connected to a coupling device for connection and disconnection of electric power of a further load flow control device which is disposed in another branch of the same direct current voltage network node. Thus the device can be used economically and flexibly for control of a load flow on or in a network node.

15 Claims, 9 Drawing Sheets

COUPLING-IN AND COUPLING-OUT OF POWER IN A BRANCH OF A DC VOLTAGE NETWORK NODE COMPRISING A LONGITUDINAL VOLTAGE SOURCE

BACKGROUND OF THE INVENTION

Field of the Invention

The invention relates to an apparatus for coupling in and coupling out power in a branch of a DC voltage network node comprising a longitudinal voltage source, which has means for coupling in or coupling out electric power.

WO2010/115453A1 proposes voltage compensation in DC transmission networks. In said document, longitudinal voltage sources are introduced into DC transmission lines in order to keep the voltage in the DC networks within a permissible range at all points. By introducing the longitudinal voltage source, unavoidably energy is supplied to or conducted away from the DC system at this point. In accordance with WO2010/115453, this energy is drawn from a three-phase system provided or is drawn from the DC line itself by means of an additional device.

The apparatus mentioned at the outset has the disadvantage that it severely limits the possibilities in respect of energy flow control.

The object of the invention therefore consists in providing an apparatus of the type mentioned at the outset which can be used economically and flexibly for controlling a load flow at a network node.

BRIEF SUMMARY OF THE INVENTION

The invention achieves this object by virtue of the fact that the means for coupling in and coupling out electric power are coupled to means for coupling in and coupling out electric power of a further apparatus for load flow control, which further apparatus is arranged in another branch of the same DC voltage network node. By virtue of the coupling to a plurality of apparatuses for load flow control, in particular via the DC voltage network node, it is possible to achieve load flow control in a flexible manner since the means for coupling in and coupling out electric power make it possible to use, in an expedient manner, electric power output by a longitudinal voltage source, for example, for any desired purpose. For example, the longitudinal voltage source can be designed for supplying a consumer or for feeding electrical energy from a source into the DC voltage network node. Instead of the consumer or the source, a power supply system can also be provided.

However, the consumer may also at the same time be an energy store, for example a hydroenergy store, a mechanical store, an electrical or chemical energy store. If required, the consumer then becomes the energy source. The consumer can also be a conventional energy consumer, for example an industrial plant, a housing development or the like.

For complete load flow control, the number of apparatuses according to the invention at a DC voltage network node can be one fewer than the number of branches of said network node. If, therefore, n is the number of branches of the DC voltage network node, the number m of apparatuses according to the invention which is required for complete load flow control is calculated in accordance with m=n−1.

The apparatus according to the invention is intended for use in an HVDC network, wherein the coupling of a plurality of apparatuses via a low-voltage busbar is possible. This reduces the complexity involved in the power exchange considerably.

The longitudinal voltage source can be connected to a low-voltage busbar designed for alternating current. In this case, low voltage means a voltage of a few kilovolts in contrast to the operating voltages of the branch of several hundred kilovolts.

Within the context of one configuration, the longitudinal voltage source is connectable to a neutral point (ground potential) via a transverse current source.

In particular, the DC voltage node can be connected to the neutral point via the transverse current source.

In particular, the apparatus can have a transverse current source which is designed for connection to the neutral point. Alternatively, the apparatus can be designed for connection to the (for example one terminal or pole of the) transverse current source.

Preferably, the transverse current source is connectable to the DC voltage network node.

The transverse current source represents an option for the case where the total energy of the energy drawn by the longitudinal voltage sources and the energy fed by the longitudinal voltage sources is not equal to zero.

One development consists in that the longitudinal voltage source is coupled to the AC system via a transverse current source or directly (for example via a transformer).

A further development consists in that the longitudinal voltage source has at least one converter. For high-voltage direct-current (HVDC) transmission, so-called modular multilevel converters (MMCs) are used, whose basic module is a half-bridge comprising IGBTs and diodes, for example. This basic module is also referred to as submodule (also: converter module). It is known to connect a multiplicity of such submodules in series with one another in order to achieve HV strength.

An additional development consists in that the longitudinal voltage source has at least one phase module comprising at least two phase module branches connected in series, wherein a center tap between the phase module branches is connectable to an AC voltage connection, in particular to a transformer.

In particular, a plurality of phase modules can be connected in parallel with one another and thus realize a polyphase converter.

A further configuration consists in that the longitudinal voltage source is connected in series with a mechanical switch, and a power switching unit is arranged in parallel with the longitudinal voltage source and the mechanical switch.

The longitudinal voltage source can be used by way of example as follows. It is firstly used as commutation voltage when, for example, short-circuit currents are intended to be interrupted. First, a high current rise and/or an excessively high current over a specific duration is detected. Then, a tripping signal is transmitted to a tripping unit of the mechanical switch in the continuous current path. At the same time, the power semiconductor switches of the power semiconductor unit in the switching path are switched on. Finally, a back-emf is generated, which generates a circulating current in the mesh formed from the continuous current path and the switching current path, which circulating current is in opposition to the short-circuit current to be switched in the continuous current path. The longitudinal voltage source actively generates a back-emf, for example. As a deviation from this, the longitudinal voltage source, as in the document mentioned at the outset, is realized as an auxiliary electronic switch. An IGBT or IGCT with a freewheeling diode which is parallel in opposition, for example, is suitable as auxiliary electronic switch. It goes without saying that it is also possible for a plurality of series-connected auxiliary electronic switches which are arranged back-to-back in series to be used. The switching-off of the auxiliary switch can be equated to the application of a back-emf, which acts in opposition to the current flow in the continuous current path. The current is commutated into the switch-off branch by means of the longitudinal voltage source, with the result that the mechanical switch is opened at zero current. The actual interruption of the short-circuit current takes place in the power switching unit.

Within the scope of the invention, the longitudinal voltage source can in principle have any desired design. However, particular advantages are considered to be that the longitudinal voltage source has at least one submodule, which is provided with an energy store and a power semiconductor circuit, wherein each submodule has means for coupling in and coupling out electric power. If a plurality of submodules of this type is provided, these submodules are connected in series with one another.

Advantageously, each submodule has a half-bridge circuit. Such half-bridge circuits are provided with a power semiconductor circuit, which consists of a series circuit comprising two power semiconductor switches, wherein the series circuit is connected in parallel with an energy store, for example a unipolar storage capacitor. The potential point between the two power semiconductor switches of the series circuit is connected to a first connection terminal, wherein a pole of the energy store is connected to a second connection terminal of the submodule.

If required, a freewheeling diode in opposition is connected in parallel with the power semiconductor switches. Possible power semiconductor switches are, for example, IGBTs or IGCTs. By virtue of the half-bridge circuit, either the energy store voltage $U_C$ which forms as a voltage drop across the energy store or else a zero voltage can be generated at the connection terminals of each submodule. In accordance with this advantageous development, the longitudinal voltage source can therefore actively generate a back-emf in only one direction.

Thus, half-bridge circuits are particularly suitable when the direction of the back-emf to be impressed is known.

In order to be able to build up a voltage in both directions, however, submodules which have a full-bridge circuit are advantageous. These submodules are also connected in series, with the result that the longitudinal voltage source consists of a series circuit of submodules. The submodules having a full-bridge circuit are each provided with two series circuits comprising two power semiconductor switches, wherein the potential point between the two power semiconductor switches connected in series of the first series circuit is connected to the first connection terminal, and the potential point between the two power semiconductor switches of the second series circuit is connected to the second connection terminal. Both series circuits are connected in parallel with an energy store. Overall, the full-bridge circuit thus has four power semiconductor switches. If required, a freewheeling diode is again connected in parallel, in opposition, with each of these power semiconductor switches. Owing to this circuit arrangement, either the energy store voltage $U_C$ which forms as a voltage drop across the energy store, a zero voltage or else the inverse energy store voltage $-U_C$ can be generated at the connection terminals of each submodule. Therefore, with a series circuit of such full-bridge submodules, back-emfs are built up in both directions, wherein the maximum back-emf is dependent on the number of submodules. By using pulse width modulation during the actuation of the power semiconductor switches, the back-emf can be varied quasi continuously between the maximum positive and the maximum inverse energy store voltage.

Expediently, an AC voltage in the low-voltage range can be generated by the means for coupling in and coupling out electric power. The AC voltage has the advantage that it can easily be coupled, for example, inductively and in a cost-effective manner to other means for coupling in and coupling out electric power generating AC voltage.

In accordance with an expedient development in this regard, the means for coupling in and coupling out electric power have at least one series circuit comprising two power semiconductor switches which can be switched on and off and a coil, said series circuit being connected in parallel with the energy store. The coil is connected at one of its terminals to the potential point between the power semiconductor switches of said series circuit. In accordance with a development in this regard, at least one capacitor is also used in addition to a coil. It is also possible for two series circuits in the form of a hard-switched full-bridge to be used, wherein the potential points between the two power semiconductor switches of the two series circuits are connected to different terminals of the coil.

Expediently, the coil is inductively coupled to a coil of a longitudinal voltage source of a further apparatus according to the invention which is arranged in another branch of the DC voltage network node. This inductive coupling takes place via individual transformers, for example. The individual transformers have secondary windings, which are connected to the low-voltage busbar. It is also possible to arrange all of the coils on a common transformer.

The invention likewise relates to a mains voltage node (DC voltage network node) having branches, wherein an apparatus in accordance with the present invention is arranged in at least two branches.

Expediently, the means for coupling in and coupling out electric power of the at least two apparatuses in accordance with the invention are coupled to one another via a low-voltage busbar. The low-voltage busbar is designed for AC voltages, for example.

BRIEF DESCRIPTION OF THE SEVERAL VIEWS OF THE DRAWING

Further expedient configurations and advantages of the invention are the subject matter of the description below relating to exemplary embodiments of the invention with reference to the figures in the drawing, wherein the same reference symbols refer to functionally identical component parts, and wherein.

DESCRIPTION OF THE INVENTION

Figure 1:
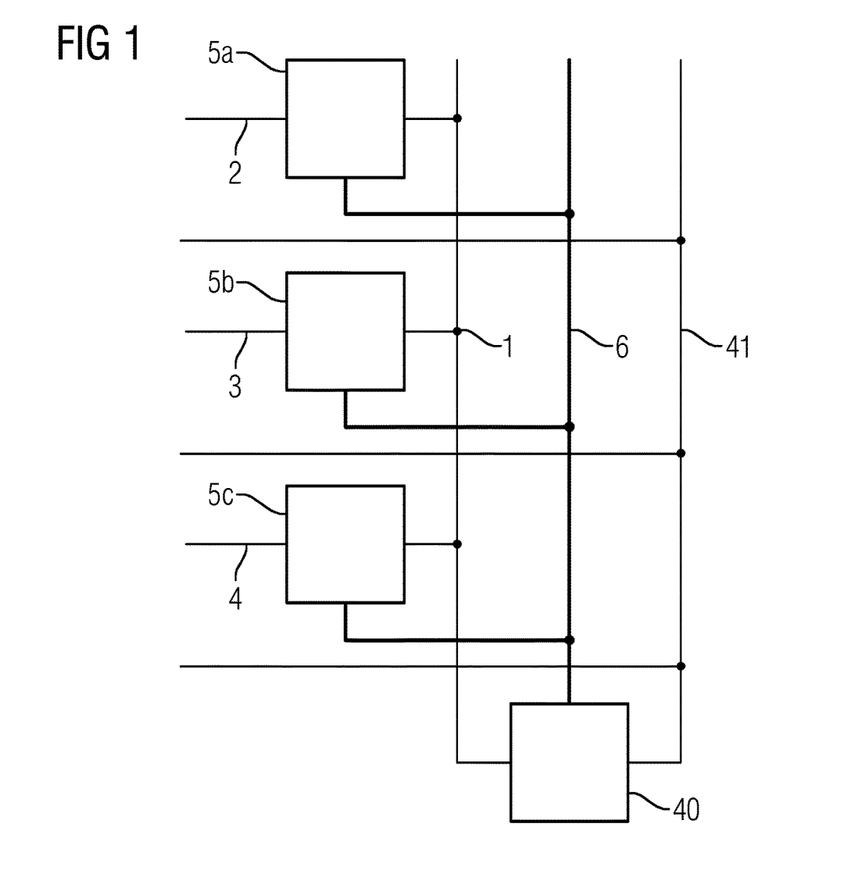
FIG. 1 shows a DC voltage network node comprising a series of branches, in which in each case one exemplary embodiment of the apparatus according to the invention is illustrated schematically.

FIG. 1 shows an exemplary embodiment of a DC voltage network node 1 according to the invention, which has a series of branches 2, 3, 4, in which in each case one exemplary embodiment of the apparatus 5 according to the invention is arranged. Each apparatus 5 has a longitudinal voltage source comprising means for coupling in and coupling out electric power, wherein the means for coupling in and coupling out electric power are connected to one another via a low-voltage busbar 6. In this way, power exchange between the apparatuses 5a, 5b and 5c is made possible, for example. Optionally, a transverse current source 40 is provided, which can be connected to the DC voltage network node 1 and the low-voltage busbar 6. Furthermore, a neutral point 41 (ground potential) can be provided, which is connected to the apparatuses 5a, 5b and 5c and the transverse current source 40.

Figure 5:
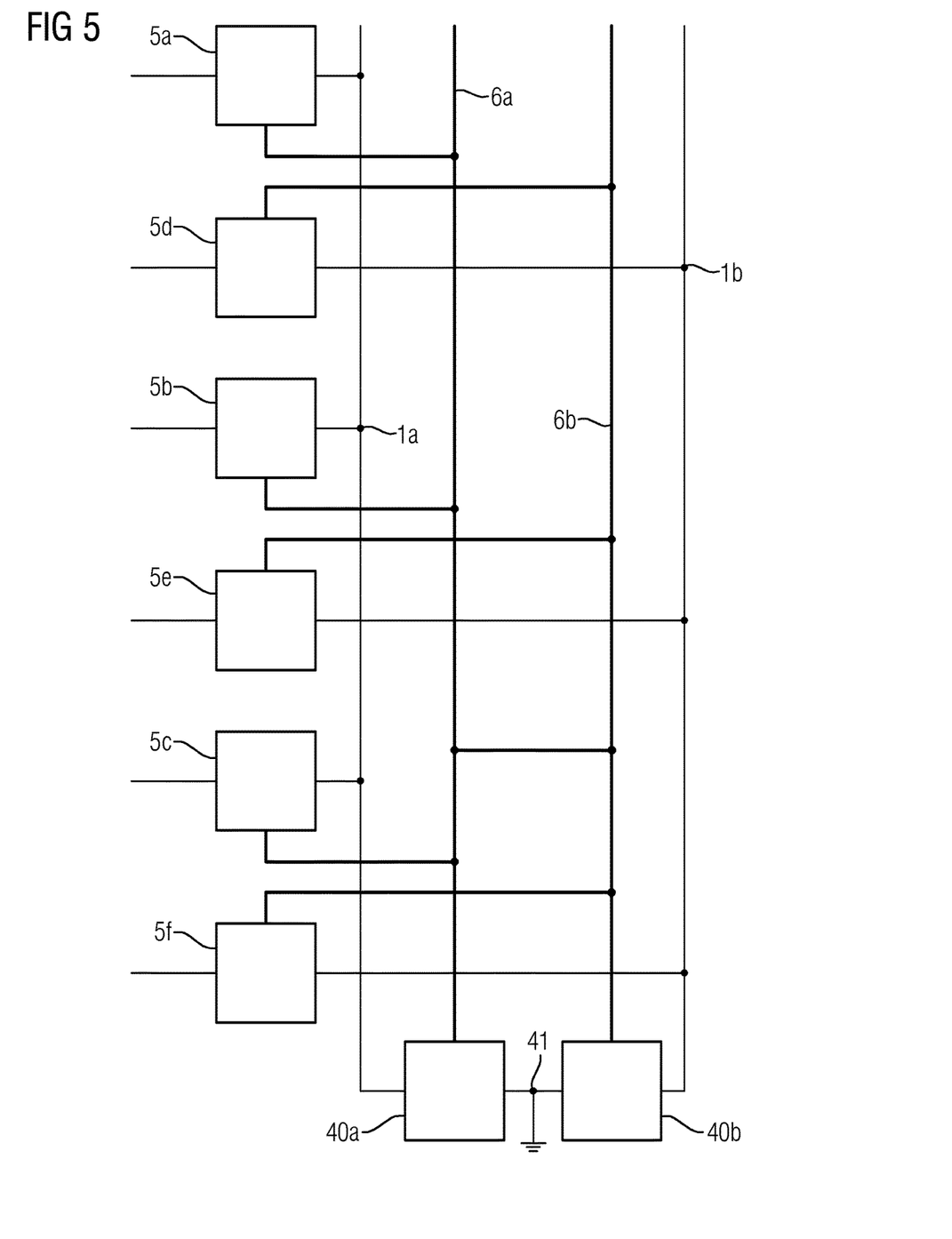
FIG. 5 shows, on the basis of FIG. 1, a bipolar DC voltage transmission network comprising apparatuses according to the invention and two optional transverse current sources, FIGS. 6-11 each show an exemplary embodiment of the means for coupling in and coupling out electric power, schematically.

FIG. 5 shows, on the basis of the illustration shown in FIG. 1, the case of a bipolar DC voltage transmission network comprising a positive star point 1a and a negative star point 1b and a busbar 6a for apparatuses 5a to 5c and a busbar 6b for apparatuses 5d to 5e.

Optionally, two transverse current sources 40a and 40b can be provided, which are coupled via the neutral point 41. The transverse current source 40a is connected to the positive star point 1a and to the busbar 6a, and the transverse current source 40b is connected to the negative star point 1b and the busbar 6b.

Figure 15:
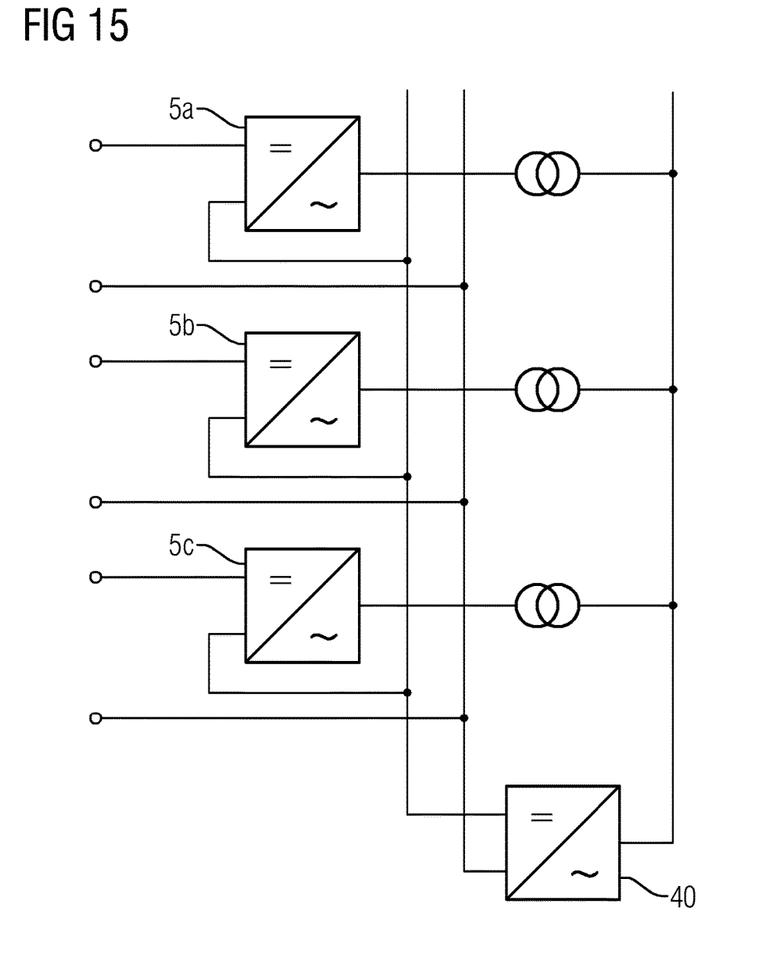
FIG. 15 shows, on the basis of FIG. 1, an exemplary realization of the apparatus according to the invention comprising an optional transverse current source using a converter.

FIG. 15 shows an exemplary embodiment on the basis of FIG. 1, wherein the apparatuses 5a to 5c and the transverse current source 40 are each in the form of a converter. The AC connections of the apparatuses 5a to 5c are coupled to the AC connection of the transverse current source 40 via a transformer.

Figure 2:
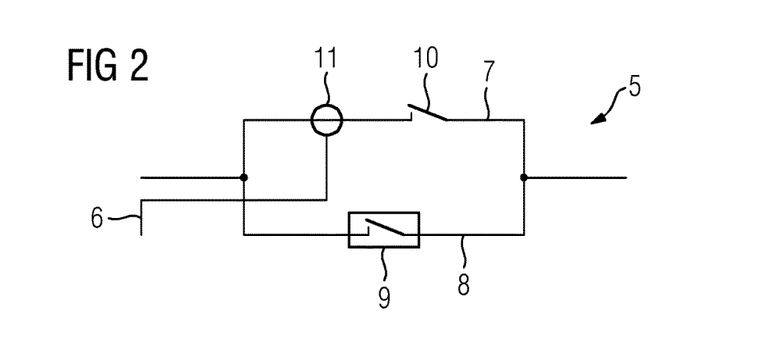
FIG. 2 shows an exemplary embodiment of the apparatus according to the invention in conjunction with an interruption circuit.

FIG. 2 shows an exemplary embodiment of the apparatus according to the invention in conjunction with an interruption circuit. In accordance with this example, the apparatus 5 comprises, by way of example, a continuous current path 7 and a switch-off current path 8, in which a power switching unit 9 is arranged. The power switching unit 9 is designed to interrupt high short-circuit currents which are driven by high voltages of up to 500 kV. Such power switching units are known to a person skilled in the art, and therefore details are not given of the configuration of said power switching unit at this juncture. They have, for example, a series circuit of power semiconductor switches, IGBTs, IGCTs, GTOs or the like, with in each case one freewheeling diode being connected in parallel, in opposition, therewith. In this case, the power semiconductor switches and therefore the freewheeling diodes assigned thereto are not all oriented in the same direction of current flow. Instead, arranging the power semiconductor switches back-to-back in series with one another makes it possible to switch currents in both directions. In order to dissipate the energy released during switching, surge arrestors are used in the parallel circuit with the power semiconductor switches. A quick-response mechanical switch 10 which is closed during normal operation is arranged in the continuous current path 7. In addition, a longitudinal voltage source 11 is illustrated schematically as well as the low-voltage busbar 6 for coupling the apparatuses 5a, 5b and 5c. As has already been explained, the longitudinal voltage source actively generates a back-emf in the mesh consisting of the continuous current path 7 and the switch-off path 8. The back-emf ensures a circulating current in the mesh which is in opposition to the normal direct current in the continuous current path. The resultant current in the continuous current path can therefore be limited or completely suppressed.

Figure 3:
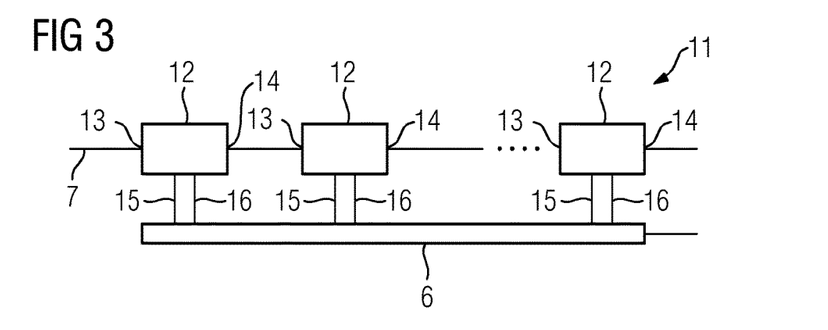
FIG. 3 shows an exemplary embodiment of a longitudinal voltage source of the apparatus.

FIG. 3 shows an exemplary embodiment of the longitudinal voltage source 11 contained in the apparatus, which longitudinal voltage source in this case consists of a series circuit as submodules 12, by way of example. The submodules 12 each have a first connection terminal 13 and a second connection terminal 14. In this case, the connection terminals 13 and 14 are arranged in the continuous current path 7, where they conduct a direct current during normal operation. Each submodule also has a first AC voltage connection terminal 15 and a second AC voltage connection terminal 16. The two AC voltage connection terminals 15 and 16 are each connected to the low-voltage busbar 6. In this case, for example, inductances, transformers or the like can be used, with further details in this regard being given later in the text.

Figure 4:
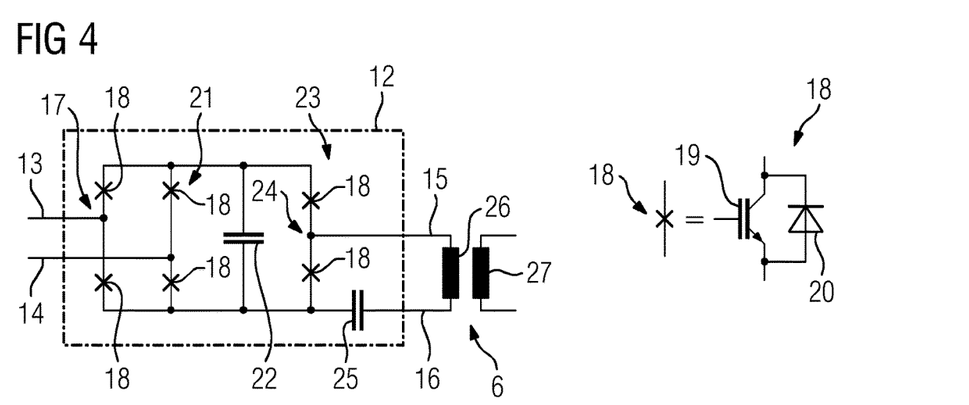
FIG. 4 shows a submodule of a longitudinal voltage source including the means for coupling in and coupling out electric power.

FIG. 4 shows an exemplary embodiment of a submodule 12, wherein the submodule illustrated in FIG. 4 has a full-bridge circuit, by way of example. In other words, the submodule 12 has a first series circuit comprising two power semiconductor switching units 18. Each power semiconductor switching unit 18 consists of an IGBT 19 as power semiconductor switch and a freewheeling diode 20, which is connected in parallel therewith, in opposition. In addition, a second series circuit 21 is shown, which is likewise formed from two power semiconductor switching units 18. The first series circuit 17 and the second series circuit 21 are each connected in parallel with an energy store 22, which is in the form of a storage capacitor. The potential point between the power semiconductor switching units 18 of the first series circuit 17 is connected to the first connection terminal 13, and the potential point between the power semiconductor switching units 18 of the second series circuit 21 is connected to the second connection terminal 14 of the submodule 12. In addition, means for coupling in and coupling out electric power 23 are provided, which means have a series circuit 24 comprising two power semiconductor switching units 18, wherein the potential point between the power semiconductor switching units 18 of the series circuit 24 is connected to the first AC voltage connection terminal 15. This second AC voltage connection terminal 16 is connected to the pole of the energy store 22 via a capacitor 25. In addition, the means for coupling in and coupling out electric power 23 have an inductance 26, which is coupled to an inductance 27 of the low-voltage busbar 6. The inductance or coil 26 does not need to be designed for high voltages in the region of 500 kV, owing to a lack of grounding. Owing to its connection to one of the poles of the energy store, i.e. to the DC link, with a capacitor interposed, the AC voltages which can be generated thereby are within the low-voltage range.

Figure 6:
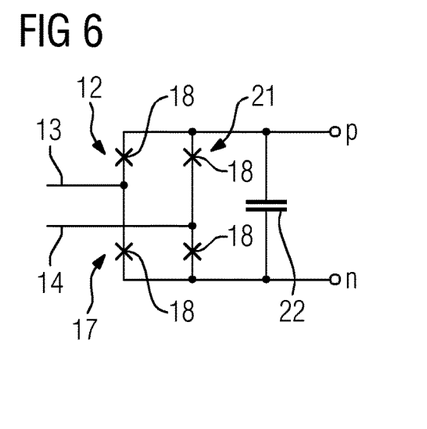

FIG. 6 once again shows a submodule 12 with a full-bridge, the details of which have already been given in connection with FIG. 4. FIG. 6 shows the submodule 12 without means for coupling in and coupling out electric power, however. Instead, connection points P and N for the connection of the means 23 for coupling in and coupling out electric power on the DC voltage side are illustrated.

FIGS. 7, 8, 9, 10 and 11 show different configurations of the means for coupling in and coupling out electric power 23.

Figure 7:
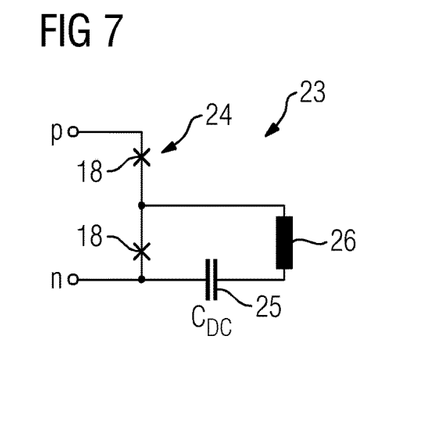

FIG. 7 shows a first exemplary embodiment of the means for coupling in and coupling out electric power 23, which has already been explained in connection with FIG. 4.

Figure 8:
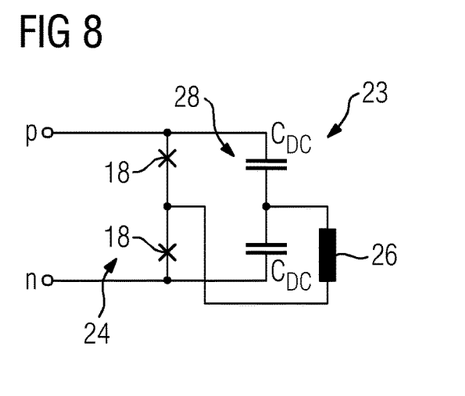

FIG. 8 shows a further exemplary embodiment of the means for coupling in and coupling out electric power 23, which are configured as a half-bridge, corresponding to the example shown in FIG. 7, and have a series circuit 24 comprising two power semiconductor switching units 18, wherein a series circuit comprising two capacitors $C_{DC}$ are connected in parallel with the series circuit 24. The potential point between the two capacitors is connected to the first terminal of the coil 26, wherein the other terminal of the coil 26 is connected to the potential point between the power semiconductor switching units 18 of the series circuit 24. As in the configuration of the means for coupling in and coupling out electric power illustrated in FIG. 7, the exemplary embodiment shown in FIG. 8 is a hard-switching half-bridge. In comparison with FIG. 7, however, the DC link is realized by the capacitors $C_{DC}$ as voltage dividers.

Figure 9:
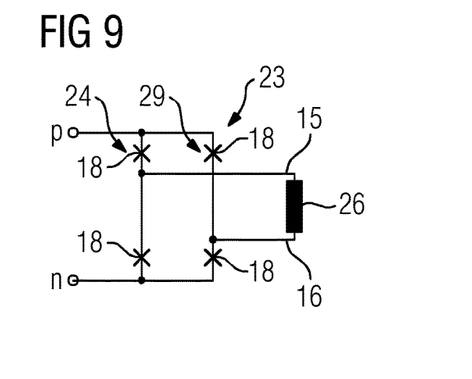

FIG. 9 shows a further exemplary embodiment of the means for coupling in and coupling out electric power 23, which, in addition to a first series circuit comprising two power semiconductor switching units, has a second series circuit 29 comprising two power semiconductor switching units 18. The potential point between the power semiconductor switching units 18 of the first series circuit 24 is connected to a first terminal of the coil 26 via the first AC voltage connection terminal 15, while the potential point between the power semiconductor switching units 18 of the second series circuit 29 is connected to the other terminal of the coil 26 via the second AC voltage connection terminal 16. The circuit shown in FIG. 9 can be referred to as a hard-switched full-bridge.

Figure 10:
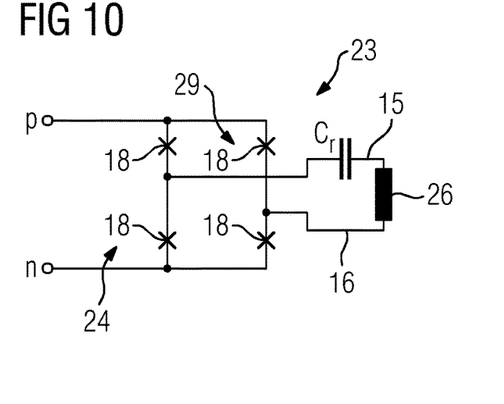

The exemplary embodiment shown in FIG. 10 largely corresponds to the exemplary embodiment shown in FIG. 9, but a capacitor $C_r$ is arranged in the first AC voltage connection terminal 15, i.e. on the AC voltage side. This is accordingly a full-bridge with resonant switching.

Figure 11:
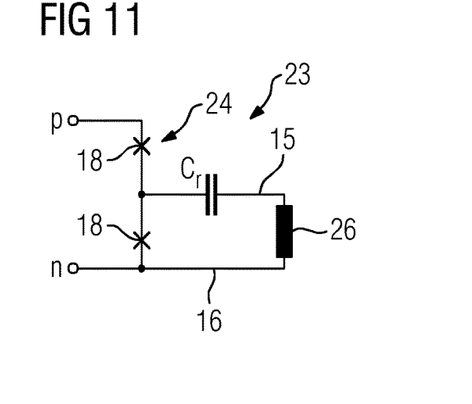

FIG. 11 largely corresponds to the exemplary embodiment shown in FIG. 7, but the capacitor is arranged on the AC voltage side of the coil 26 as resonant capacitor. The means 23 for coupling in and coupling out electric power shown in FIG. 11 can therefore be referred to as half-bridge with resonant switching.

In respect of the exemplary embodiments 7 to 11, it can be stated by way of summary that the means for coupling in and coupling out electric power in the form of a half-bridge or full-bridge can have both hard switching and resonant switching. The resonant switching has the advantage of the higher achievable clock frequency and therefore a smaller size of the transformer(s) for coupling the inductances of different apparatuses according to the invention.

Figure 12:
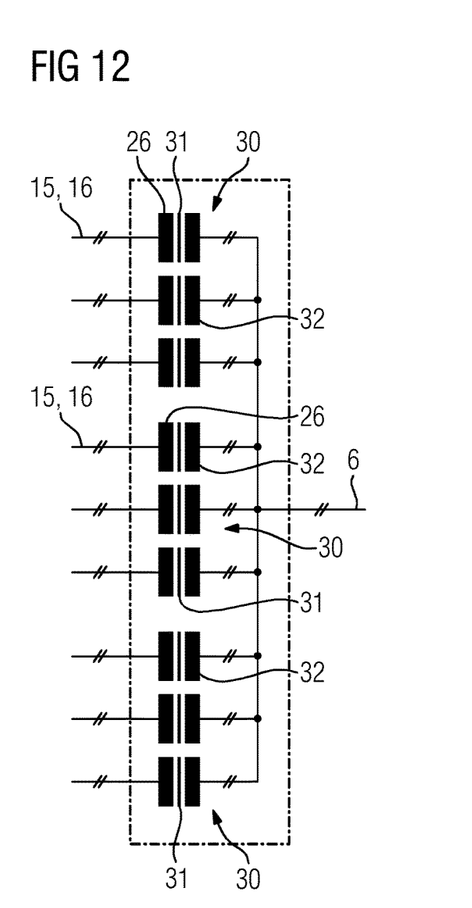
FIGS. 12-14 show exemplary embodiments of transformers for coupling the AC voltages which can be generated by the means for coupling in and coupling out electric power.
Figure 13:
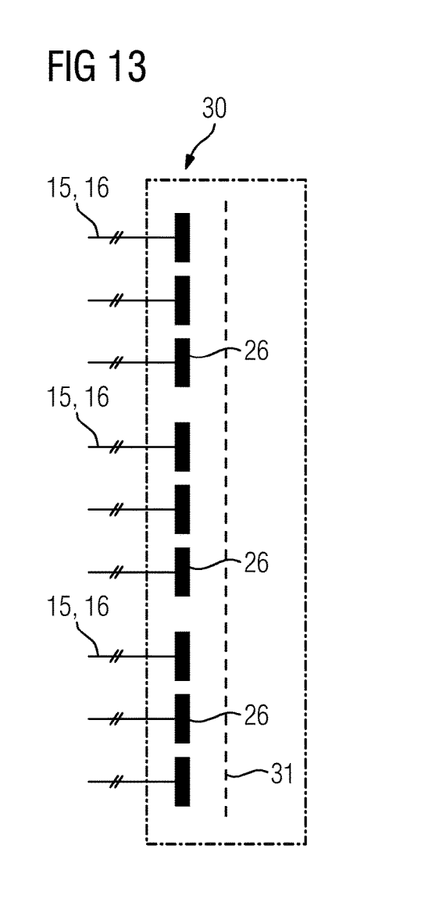
Figure 14:
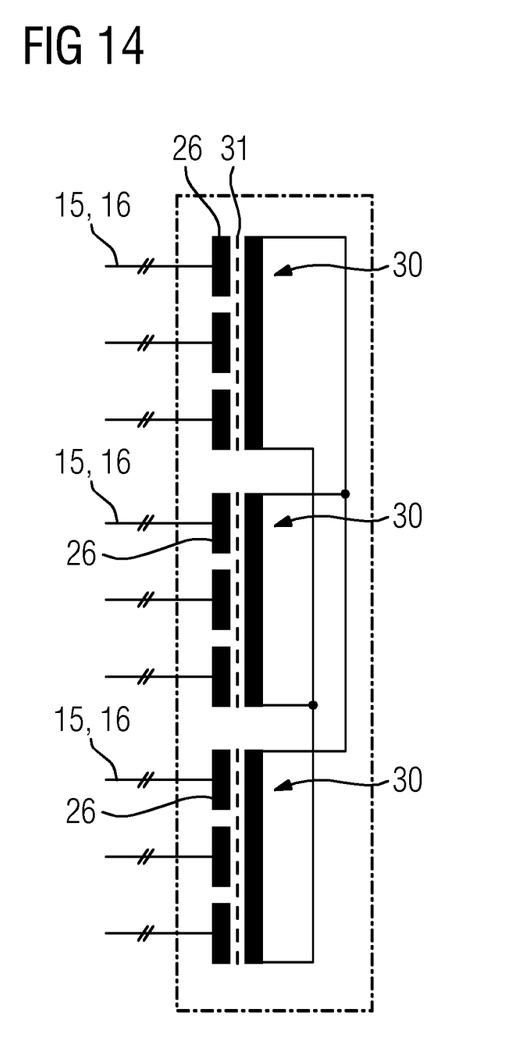

Possible realizations of such transformers 30 are shown in FIGS. 12, 13 and 14. In the exemplary embodiment shown in FIG. 12, a multiplicity of individual transformers 30 is provided. The primary winding of each individual transformer 30 is formed by a coil 26 of the means for coupling in and coupling out electric power 23. It is coupled to a secondary winding 32 via a core 31 of the transformer 30. All of the secondary windings are connected to one another via the busbar 6.

FIG. 14 shows an exemplary embodiment comprising three transformers 30. The secondary windings of the transformers 30 are connected to one another again via a busbar 6. However, the secondary windings are each coupled to a plurality of inductances or coils 26 of the means for coupling in and coupling out electric power 23. In contrast to the exemplary embodiments 12 and 14, the transformer 30 shown in FIG. 13 does not have any secondary windings or a busbar 6. The inductances of the means for coupling in and coupling out electric power are instead only connected to one another via the core 31 of the transformer. The exchanged powers in this case add up to zero.

Figure 16:
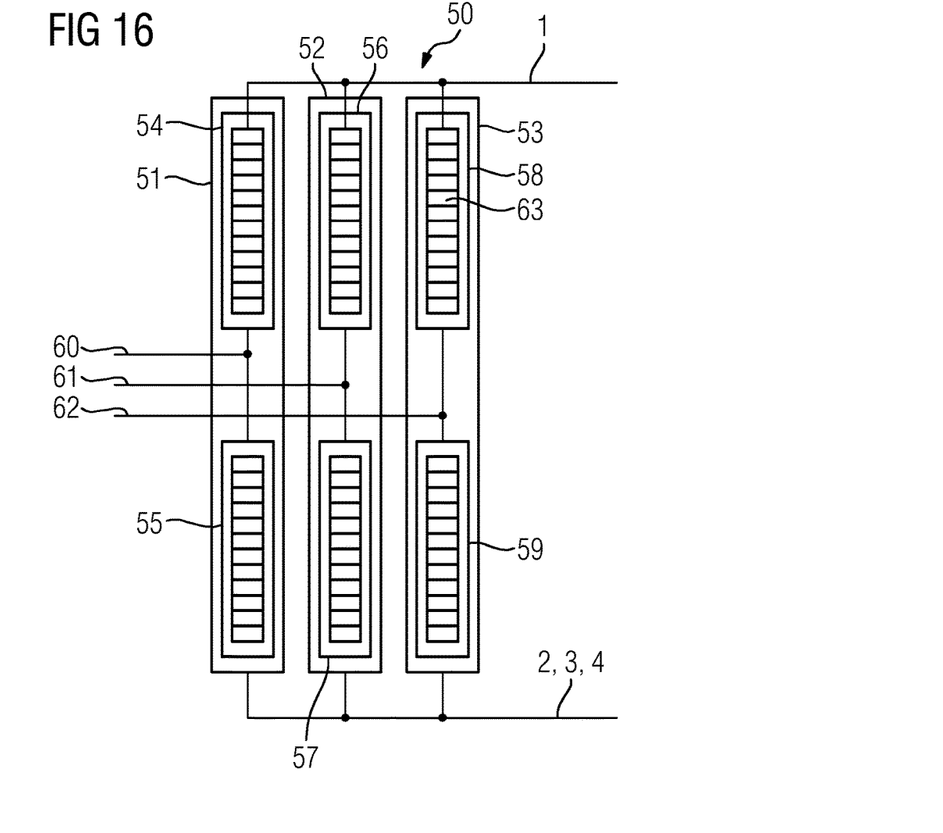
FIG. 16 shows an exemplary realization of an arrangement which can be used as longitudinal voltage source or as transverse current source.

FIG. 16 shows an exemplary realization of a longitudinal voltage source in the form of an arrangement 50, as can be used, for example, as component 5a to 5c. The arrangement 50 is connected to the DC voltage node 1, on one side, and to one of the branches 2, 3 or 4 on the other side. To this extent, the longitudinal voltage source can be represented as a two-port network, which is connected between the two poles 1 and 2 (or 3 or 4) of a DC voltage.

The arrangement 50 is a modular converter comprising three phase modules 51, 52 and 53, of which each has two phase module branches 54 and 55, 56 and 57, and 58 and 59. An AC voltage connection 60, 61, 62 is provided between the respective phase module branches.

Each phase module branch 54 to 59 has a multiplicity of series-connected submodules 63.

Figure 17:
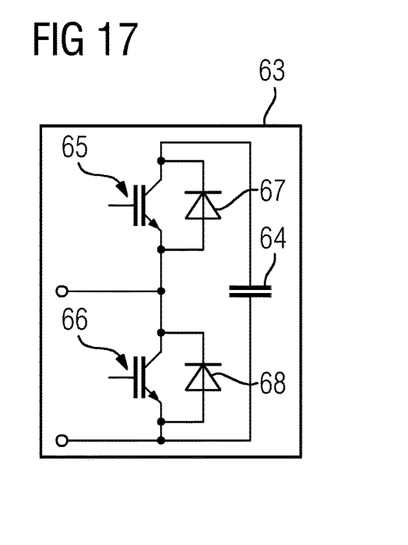
FIG. 17 shows a submodule as a half-bridge circuit.

The submodules 63 can be embodied as a half-bridge circuit, as shown in FIG. 17, with an energy store 64, which is arranged in parallel with a series circuit comprising two power semiconductor switches 65, 66, with in each case one freewheeling diode 67, 68 being provided in parallel therewith and in opposition thereto.

Figure 18:
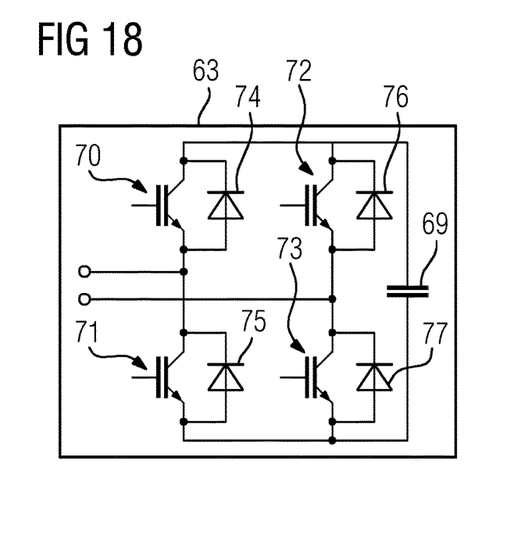
FIG. 18 shows a submodule as a full-bridge circuit.

As shown in FIG. 18, the submodule 63 can be embodied alternatively as a full-bridge circuit. In this case, four power semiconductor switches 70 to 73 are provided, of which in each case two are connected in series, and two such series circuits are arranged in parallel with an energy store 69. A freewheeling diode 74 to 77 is arranged in parallel, in opposition, with each of the power semiconductor switches. In the case of the half-bridge circuit, only one polarity of the voltage is possible on the DC side, whereas the full-bridge circuit can generate both voltage polarities.

The AC voltage connections 60, 61 and 62 can be connected to a three-phase transformer. By way of example, the circuit shown in FIG. 16 is embodied with three phase modules. Correspondingly, it is possible to provide a single phase module or any desired number of phase modules. At least two phase modules then having two AC voltage connections are provided for the connection of a transformer.

The longitudinal voltage sources 5a to 5c can be constructed from a series circuit of submodules 12, which can be embodied as four-port networks, as is illustrated by way of example in FIG. 3.

It is noted by way of addition that the transverse current source 40, 40a or 40b can also be embodied in accordance with the arrangement in FIG. 3. Alternatively, the transverse current source 40, 40a or 40b can be embodied corresponding to the arrangement shown in FIG. 16.

Advantageously, the transverse current source can be realized by means of half-bridge circuits, and the longitudinal voltage source can be realized advantageously by means of full-bridge circuits.

Figure 19:
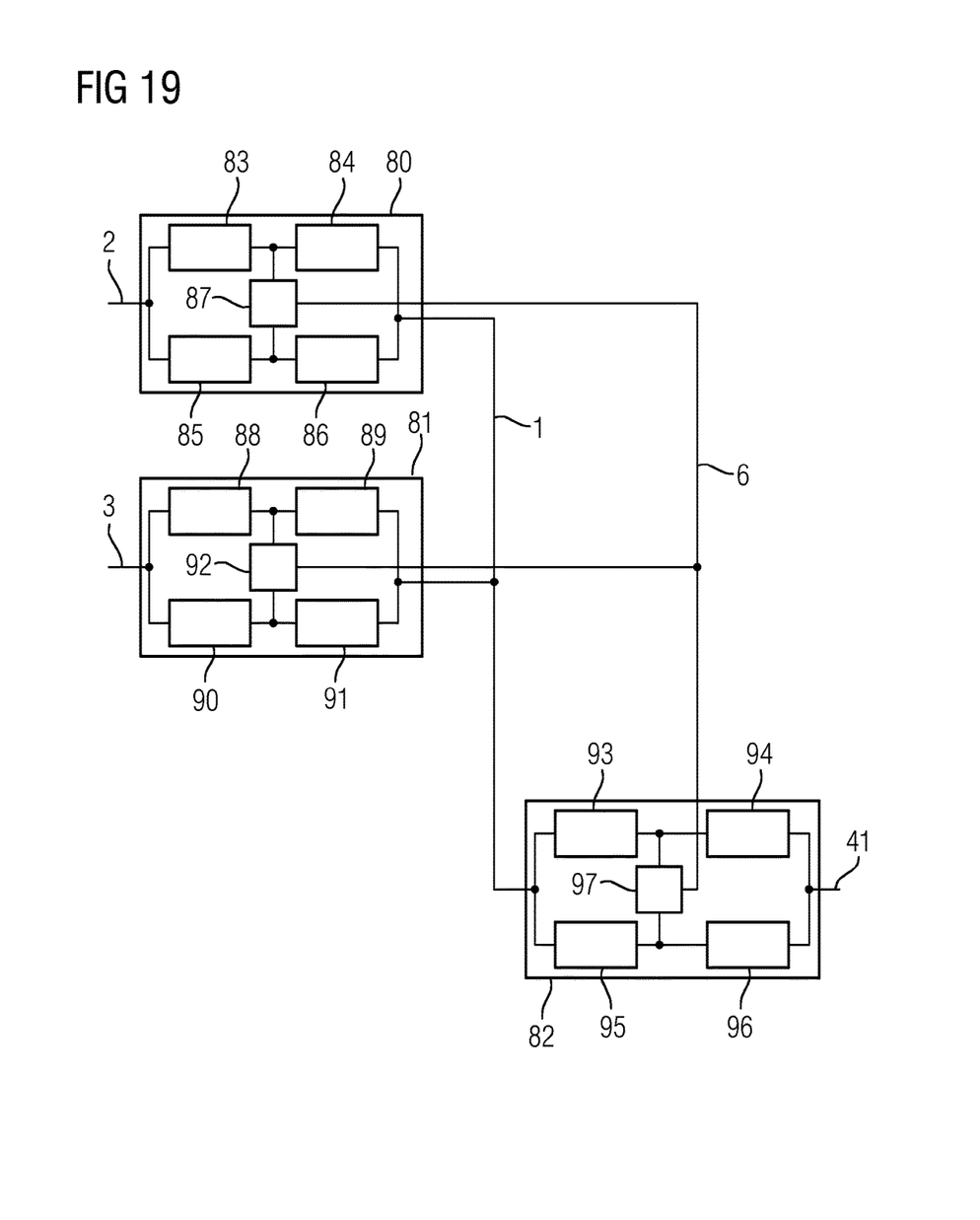
FIG. 19 shows an exemplary realization comprising two longitudinal voltage sources and a transverse current source, which are coupled to one another via the busbar.

FIG. 19 shows a schematic circuit arrangement comprising a longitudinal voltage source 80 (cf. longitudinal voltage source 5a in FIG. 1), a longitudinal voltage source 81 (cf. longitudinal voltage source 5b in FIG. 1) and a transverse current source 82 (cf. transverse current source 40 in FIG. 1).

The longitudinal voltage sources 80, 81 and the transverse current source 82 have a similar design corresponding to the statements in relation to arrangement 50:

Thus, the longitudinal voltage source 80 comprises a plurality of phase modules 83 to 86, wherein the phase module 83 is connected in series with the phase module 84. Furthermore, the phase modules 85 and 86 are connected in series. The two series circuits comprising the phase modules are connected in parallel with one another, wherein a center tap between the phase modules which are in each case connected in series is connected to the low-voltage busbar 6 via a transformer 87. The longitudinal voltage source 80 is arranged between the branch 2 and the DC voltage node 1.

These statements apply correspondingly to the longitudinal voltage source 81, which is arranged between the branch 3 and the DC voltage node 1. This longitudinal voltage source 81 comprises phase modules 88 to 91, which are arranged corresponding to the longitudinal voltage source 81. In addition, a transformer 92 is provided, which is connected to the low-voltage busbar 6.

The transverse current source 82 also comprises phase modules 93 to 96, which are arranged correspondingly. A transformer 97 of the transverse current source 82 is connected to the AC voltage connections and to the low-voltage busbar 6. The transverse current source 82 is connected on one side to the DC voltage node 1 and on the other side to the neutral point 41.

The longitudinal voltage sources 80, 81 and the transverse current source 82 can exchange energy via the low-voltage busbar 6.

As has already been mentioned in respect of FIG. 16, the longitudinal voltage sources 80, 81 and/or the transverse current source 82 can also have a plurality of phase module branches and correspondingly also provide a plurality of AC voltage connections, of which in each case two are coupled via a transformer.

LIST OF REFERENCE SYMBOLS

1 DC voltage network node
2 Branch
3 Branch
4 Branch
5 Apparatus
5a-5f Apparatus
6 Low-voltage busbar
7 Continuous current path
8 Switch-off current path
9 Power switching unit
10 Switch
11 Longitudinal voltage source
12 Submodule
13 Connection terminal
14 Connection terminal
15 AC voltage connection terminal
16 AC voltage connection terminal
17 Series circuit
18 Power semiconductor switching unit
19 Power semiconductor switching unit (for example IGBT)
20 Freewheeling diode
21 Series circuit
22 Energy store
23 Means for coupling in and coupling out electric power
24 Series circuit
25 Capacitor
26 Coil
27 Inductance
29 Series circuit
30 Transformer
31 Core of transformer
32 Secondary winding
40 Transverse current source
40a, 40b Transverse current source
41 Neutral point
50 Arrangement
51-53 Phase module
54-59 Phase module branch
60-62 AC voltage connection
64 Energy store
65, 66 Power semiconductor switch
67, 68 Freewheeling diode
69 Energy store
70-73 Power semiconductor switch
74-77 Freewheeling diode
80, 81 Longitudinal voltage source
82 Transverse current source
83-86 Phase module
87 Transformer
88-91 Phase module
92 Transformer
93-96 Phase module
97 Transformer

The invention claimed is:

1. An apparatus for load flow control of a direct current in a branch of a DC voltage network node, comprising
   a longitudinal voltage source with a coupling device for coupling in or coupling out electric power in a first branch of the DC voltage network node;
   said coupling device for coupling in and coupling out electric power being connected to a further coupling device for coupling in and coupling out electric power of a further apparatus for load flow control in a second branch of the DC voltage network node, the further apparatus including a second longitudinal voltage source and the further coupling device, the further apparatus being disposed in the second branch of the DC voltage network node.

2. The apparatus according to claim 1, which comprises a transverse current source configured to connect said longitudinal voltage source to a neutral point.

3. The apparatus according to claim 1, wherein said longitudinal voltage source includes at least one converter.

4. The apparatus according to claim 1, wherein said longitudinal voltage source has at least one phase module comprising two or more phase module branches connected in series, and wherein a center tap between said phase module branches is connectable to an AC voltage connection.

5. The apparatus according to claim 4, wherein said center tap is connectable to a transformer.

6. The apparatus according to claim 1, which comprises a mechanical switch connected in series with said longitudinal voltage source, and a power switching unit connected in parallel with said longitudinal voltage source and said mechanical switch.

7. The apparatus according to claim 1, wherein said longitudinal voltage source includes at least one submodule comprising an energy storage device and a power semiconductor circuit and further a coupling device for coupling in and coupling out electric power.

8. The apparatus according to claim 7, wherein said at least one submodule or each submodule has a half-bridge circuit.

9. The apparatus according to claim 7, wherein said at least one submodule or each submodule has a full-bridge circuit.

10. The apparatus according to claim 7, wherein said coupling device for coupling in and coupling out electric power generate an AC voltage in a low-voltage range.

11. The apparatus according to claim 10, wherein said coupling device for coupling in and coupling out electric power has at least one series circuit comprising two power semiconductor switches to be switched on and off and a coil, said series circuit being connected in parallel with said energy storage device.

12. The apparatus according to claim 11, wherein said coil is inductively coupled to a coil of a longitudinal voltage source of a further apparatus in accordance with claim 9, which further apparatus is arranged in another branch of the same said DC voltage network node.

13. A DC voltage network node, comprising:
a plurality of branches;
an apparatus according to claim 1 connected in each of at least two of said branches;
coupling devices for coupling in and coupling out electric power; and
a low-voltage busbar connecting said coupling devices to one another.

14. The DC voltage network node according to claim 13, wherein said apparatuses of said branches are coupled to one another by way of said coupling devices for coupling in and coupling out electric power, to thereby enable load flow control.

15. The DC voltage network node according to claim 13, wherein said longitudinal voltage sources are coupled inductively to one another.

* * * * *